(12) United States Patent
Ohta (10) Patent No.: US 8,081,229 B2
(45) Date of Patent: Dec. 20, 2011

(54) IMAGING APPARATUS

(75) Inventor: Atsuya Ohta, Kawasaki (JP)

(73) Assignee: Nikon Corporation, Tokyo (JP)

( * ) Notice: Subject to any disclaimer, the term of this patent is extended or adjusted under 35 U.S.C. 154(b) by 613 days.

(21) Appl. No.: 12/219,757

(22) Filed: Jul. 28, 2008

(65) Prior Publication Data

US 2009/0051791 A1 Feb. 26, 2009

(30) Foreign Application Priority Data

Aug. 3, 2007 (JP) ................................ 2007-203173
Jun. 26, 2008 (JP) ................................ 2008-167280

(51) Int. Cl.
*H04N 5/228* (2006.01)
*H04N 5/217* (2006.01)
*H04N 9/64* (2006.01)

(52) U.S. Cl. ...................... 348/222.1; 348/241; 348/243; 348/248

(58) Field of Classification Search ............ 348/241–251
See application file for complete search history.

(56) References Cited

U.S. PATENT DOCUMENTS

| 6,982,757 B2 * | 1/2006 | Tariki .............................. 348/243 |
| 7,304,670 B1 * | 12/2007 | Hussey et al. .................. 348/241 |
| 7,317,480 B1 * | 1/2008 | Cho et al. ....................... 348/243 |
| 2007/0165120 A1 * | 7/2007 | Takane .......................... 348/248 |

FOREIGN PATENT DOCUMENTS

JP A-10-126697 5/1998

* cited by examiner

*Primary Examiner* — Jason Chan
*Assistant Examiner* — Pritham Prabhakher
(74) *Attorney, Agent, or Firm* — Oliff & Berridge, PLC (57) ABSTRACT

An imaging apparatus includes: an image sensor having a plurality of pixels arranged in an array that captures an image of a subject and outputs pixel signals; a calculation unit that calculates a correction value for correcting an error of the pixel signals read out from the image sensor for each column of the array of the pixels; and a correction unit that corrects the image signals using the correction value calculated by the calculation unit. In a live view mode, the calculation unit calculates a new correction value by averaging the calculated correction value and a correction value for a previous frame.

9 Claims, 5 Drawing Sheets

IMAGING APPARATUS

INCORPORATION BY REFERENCE

The disclosures of the following priority applications are herein incorporated by reference:
Japanese Patent Application No. 2007-203173 filed Aug. 3, 2007
Japanese Patent Application No. 2008-167280 filed Jun. 26, 2008.

BACKGROUND OF THE INVENTION

1. Field of the Invention

The present invention relates to an imaging apparatus that corrects noises contained in image signals from an image sensor.

2. Description of Related Art

Japanese Laid-open Patent Application No. 10-126697 discloses a camera that corrects fixed pattern noises (FRN).

SUMMARY OF THE INVENTION

However, the conventional camera has a problem in that FPN is corrected by reading out signals at the time of resetting pixels at each imaging and subtracting the signals from acquired image signals, resulting in a deteriorated precision.

The imaging apparatus according to a first aspect of the present invention includes: an image sensor having a plurality of pixels arranged in an array that captures an image of a subject and outputs pixel signals; a calculation unit that calculates a correction value for correcting an error of the pixel signals read out from the image sensor for each column of the array of the pixels; and a correction unit that corrects the pixel signals using the correction value calculated by the calculation unit, wherein in a live view mode, the calculation unit calculates a new correction value by averaging the calculated correction value and a correction value for a previous frame.

According to a second aspect of the present invention, it is preferred that the imaging apparatus according to the first aspect further includes: an instruction unit that instructs start of capturing a still image, wherein when the start of capturing the still image is instructed by the instruction unit in a live view mode, the correction unit corrects a captured image using the correction value used in the live view mode.

According to a third aspect of the present invention, it is preferred that in the imaging apparatus according to the second aspect, the correction unit corrects the captured image using a last correction value used in the live view mode.

According to a fourth aspect of the present invention, it is preferred that in the imaging apparatus according to the first aspect, the correction unit performs the correction using the correction value read out from the image sensor before the start of the imaging or calculated during the imaging.

According to a fifth aspect of the present invention, it is preferred that in the imaging apparatus according to the first aspect, the calculation unit, in the live view mode, acquires the pixel signals from pixels in at least one predetermined line among all the pixels included in the image sensor and calculates the correction value that corresponds to the pixels in the at least one predetermined line.

The imaging apparatus according to a sixth aspect of the present invention includes: an image sensor having a plurality of pixels arranged in an array that captures an image of a subject and outputs pixel signals; a calculation unit that calculates a correction value for correcting an error of the pixel signals read out from the image sensor for each column of the array of the pixels; a correction unit that corrects the pixel signals using the correction value calculated by the calculation unit; and an instruction unit that instructs start of imaging a still image, wherein when start of imaging is instructed by the instruction unit in a live view mode, the calculation unit corrects the pixel signals using a correction value that has been used in the live view mode.

According to a seventh aspect of the present invention, it is preferred that in the imaging apparatus according to the sixth aspect, the correction unit corrects the captured image using a last correction value used in the live view mode.

According to an eighth aspect of the present invention, it is preferred that the imaging apparatus according to the sixth aspect further includes: a continuous shooting instruction unit that instructs continuous capturing of an image, wherein when capturing of an image is instructed by the continuous shooting instruction unit, the correction unit performs correction using the same correction value.

According to a tenth aspect of the present invention, in the imaging apparatus according to the first aspect, it is preferred that the pixels have each a photoelectric conversion unit, and output image signals corresponding to photoelectric signals generated by the photoelectric conversion units and pixel signals for correction including no photoelectric signals generated by the photoelectric conversion units, the calculation unit calculates a correction value for correcting an error of the image signals for each column of pixels using the pixel signals for correction, and the correction unit corrects the image signal using the calculated correction value.

According to ninth and eleventh aspects of the present invention, it is preferred that the imaging apparatus according to the sixth aspect corresponds to the imaging apparatus according to the eighth and tenth aspects, respectively.

DETAILED DESCRIPTION OF THE INVENTION

Figure 1:
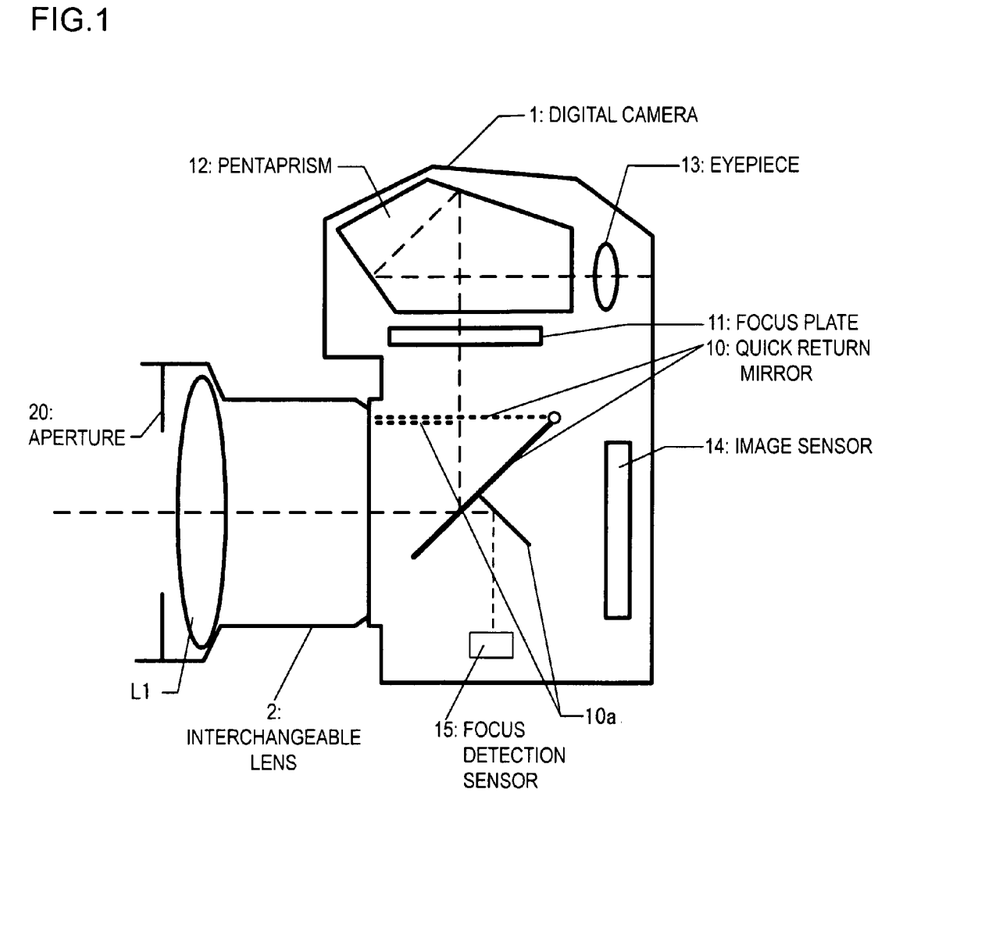
FIG. 1 is a diagram showing the configuration of a main part of a digital camera according to an embodiment of the present invention.

A camera according to an embodiment of the present invention is described with reference to the attached drawings. FIG. 1 is a diagram showing the configuration of a main part of a digital camera 1. The digital camera 1 includes in its body an interchangeable lens 2 equipped with a lens L1 and an aperture 20. On the body side of the camera 1, there are provided a quick return mirror 10, a focus plate 11, a pentaprism 12, an eyepiece 13, an image sensor 14, and a focus detection sensor 15.

Figure 2:
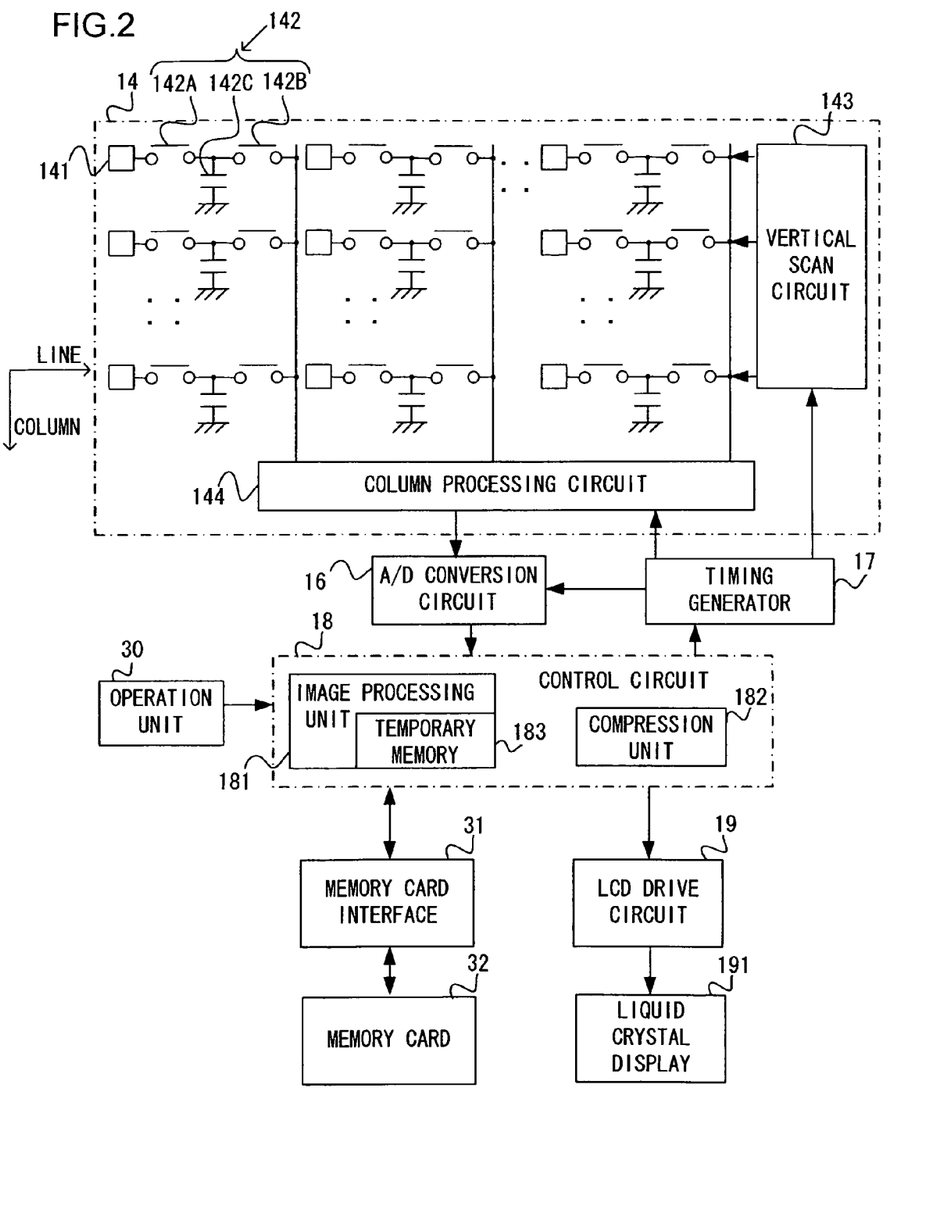
FIG. 2 is a block diagram showing the configuration of a control system of the digital camera according to an embodiment.

FIG. 2 is a block diagram showing a control system of the digital camera 1. In FIG. 2, the same components are designated by the same reference numerals. The control system of the digital camera 1 includes an image sensor 14, an A/D conversion circuit 16, a timing generator 17, a control circuit 18, an LCD drive circuit 19, a liquid crystal display 191, an operation unit 30, and a memory card interface 31.

Explanation is made with reference to FIG. 1. Before a shutter is released, light from a subject incident to the digital camera 1 through the interchangeable lens 2 is guided upward by the quick return mirror 10 arranged as indicated by a solid line in FIG. 1 to form an image of the subject on the focus plate 11. The image of the subject formed on the focus plate 11 is guided through the pentaprism 12 into the eye piece 13. As a result, the image of the subject is viewable to the photographer. A portion of the light from the subject that passes through a translucent area of the quick return mirror 10 is reflected downward by a submirror 10a to be incident to the focus detection sensor 15. After the shutter is released, the quick return mirror 10 is rotated into a position indicated by a broken line in FIG. 1 and guides the light from the subject to the image sensor 14 to form an image on an imaging surface thereof.

The control system is described with reference to FIG. 2.

The image sensor 14 is an X-Y address type photoelectric conversion device that has plural pixel photodiodes 141 arranged in an array, a switch 142 provided in each of the pixel photodiodes 141, a vertical scan circuit 143 that selects sequentially each line of the pixel photodiodes 141, and a column processing circuit 144. The switch 142 includes a transfer gate switch 142A (hereinafter, referred to as "switch 142A"), a pixel selection switch 142B (hereinafter, referred to "switch 142B"), and a capacitor 142C.

The switch 142A is a switch that is provided between the pixel photodiode 141 and the capacitor 142C and switches ON/OFF electric connection between the pixel photodiode 141 and the capacitor 142C. When both the switches 142A and 142B of a pixel are set ON, a light signal received by that pixel is photoelectrically converted and transferred to the column processing circuit 144.

On the other hand, when the switch 142A of a pixel is selected OFF, and the switch 142B is set ON, a signal generated when the connection between the pixel photodiode 141 and the column processing circuit 144 is interrupted, that is, a signal equivalent to a signal generated in a state where that pixel does not receive light (one component of the FPN to be detailed later), is transferred to the column processing circuit 144. The pixel photodiode 141 converts the received light from the subject into a pixel signal depending its intensity and outputs it to the A/D conversion circuit 16 through the column processing circuit 144.

The column processing circuit 144 includes a CDS circuit, a line memory, and so on for each column of the pixel photodiodes 141 and inputs therein pixel signals output from the pixel photodiodes 141 in the predetermined line selected by the vertical scan circuit 143 (with the switch 142A in each of the pixels in the selected line being turned OFF and the switch 142B in each of the pixels in the selected line being turned ON). On this occasion, at least the switches 142B of the respective pixel photodiodes 141 included in the line that have not been selected are all set OFF.

The column processing circuit 144 retains pixel signals obtained when the switch 142A of each of the pixels in the selected line is OFF and the switch 142B of each of the pixels in the selected line is ON as offset signals for respective columns. On this occasion, turning ON and OFF of the switches 142A and 142B is performed almost simultaneously among the selected pixels. Each offset signal thus obtained constitutes a fixed pattern noise (hereinafter, referred to as "FPN") that is streaky generated in the longitudinal direction of the captured image due to the column processing circuit 144 to be detailed later, that is, FPN for each column of the image sensor 14.

The control circuit 18 to be detailed later calculates a correction value (an FPN correction value) by using the obtained FPN and then performs FPN correction by using the calculated FPN correction value. The calculated FPN correction value is stored in a temporary memory 183 provided in the image processing unit 181 to be detailed later.

Note that when it is attempted to obtain FPN the following method may be used besides the above-mentioned method of obtaining pixel signals from the pixel photodiodes 141 of the predetermined line (selected line) in a state where in the selected line, the switches 142A are simultaneously turned OFF while the switches 142B are simultaneously turned ON. For example, FPN may be obtained in a state where the switches 142A of pixels in all the lines (that is, all the pixels) are simultaneously turned OFF and only the switches 142B of the predetermined line (selected line) are simultaneously turned ON.

The A/D conversion circuit 16 performs analog processing on the pixel signal output from the image sensor 14 before it can convert the pixel signal into digital image data. The timing generator 17 is a circuit that outputs timing signals to the image sensor 14 and the A/D conversion circuit 16 according to an instruction from the control circuit 18 to control drive timings of the image sensor 14 and the A/D conversion circuit 16.

The control circuit 18 is a calculation circuit that includes a CPU (not shown), a ROM (not shown), a RAM (not shown), and so on and controls each component of the digital camera 1 and performs various types of data processing. The control circuit 18 controls the timing generator 17.

The control circuit 18 includes the image processing unit 181 and a compression unit 182. The image processing unit 181 performs various types of image processing, such as white balance processing, gamma correction processing, color interpolation, edge emphasis, and vignette correction, on the input image data. The compression unit 182 is a circuit that performs JPEG compression processing on the image data generated by the image processing performed by the image processing unit 181.

The memory card interface 31 is an interface to which the memory card 32 is dismountably mounted. The memory card interface 31 writes image data into the memory card 32 or reads out the image data stored in the memory card 32 according to the control by the control circuit 18. The memory card 32 is a semiconductor memory card such as a COMPACT FLASH (Registered Trademark) or SD card.

The LCD drive circuit 19 is a circuit that drives the liquid crystal display 191 according to an instruction from the control circuit 18. The liquid crystal display 191, in a replay mode, displays display data prepared in the control circuit 18 based on the image data stored in the memory card 32. Further, the liquid crystal display 191 is configured to display a so-called live view image. The live view is a mode of display in which an image captured by the image sensor 14 by flipping up the quick return mirror 10 before the shutter is released is displayed real time on the liquid crystal display 191. This imaging mode is adopted in single-lens reflex cameras.

The operation unit 30 includes a switch that receives an operation by a user. The operation unit 30 includes a power switch, a release switch, and other setting menu changeover switches, and a setting menu decision button. As photographic modes, a still image capturing mode and a live view mode for displaying the above-mentioned live view mode can be set through the operation unit 30.

Now, FPN correction processing in the image processing unit 181 is described on the case where a still image capturing mode is set and the case where a live view mode is set.

—Still Image Capturing Mode—

When a still image capturing mode is set by operation of the operation unit 30 and imaging is instructed by operation of full press down of a release switch button, the control circuit 18 controls the quick return mirror 10 to be rotated into a position indicated by a broken line shown in FIG. 1, so that the light from the subject that has passed through the lens L1 is guided to the image sensor 14. Further, the control circuit 18 instructs the timing generator 17 to turn the switch 142 ON through the vertical scan circuit 143 such that signals are output from the pixel photodiodes 141 corresponding to pixels that are present in an area occupying, for example, ⅓ of the area of all the pixels constituting the image sensor 14.

Figure 3:
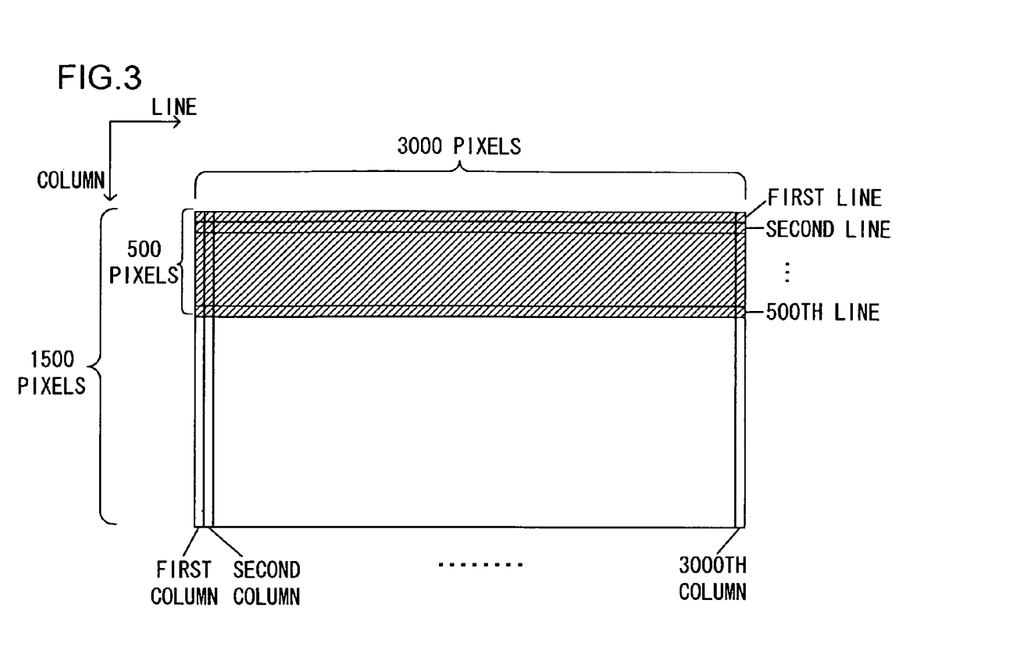
FIG. 3 is a diagram showing an area of pixels from which pixel signals are read out in a still image capturing mode.

FIG. 3 shows the area of the pixels from which pixel signals are read out with hatching. To make the description simpler, it is assumed the number of pixels of the image sensor 14 is set to 3,000×1,500 dots. In the present embodiment, pixel signals output from pixels (3,000×1,500 dots) corresponding to, for example, an upper ⅓ area of the total pixel area are read out column by column up to 3,000 columns. That is, the vertical scan circuit 143 selects first to five hundredth lines as selected lines and turns OFF and ON, respectively, the switches 142A and the switches 142B of the pixels contained in the selected lines. As a result, for each of the 1st to 3,000th columns, respective pixel signals are read out from five hundreds (500) pixel diodes 141 and input into the column processing circuit 144. The column processing circuit 144 outputs the respective pixel signals from all the columns, i.e., 3,000 columns to the image processing unit 181 in the control circuit 18 through the A/D conversion circuit 16. The image processing unit 181 calculates an FPN correction value for each of 3,000 columns by averaging the pixel signals (500 pixels) in each column and stores the obtained FPN correction values for each column in the temporary memory 183.

Then, the control circuit 18 instructs the timing generator 17 to turn ON the respective switches 142A and 142B in all the pixels so that the pixel signals output from all the pixels of the image sensor 14 are input into the image processing unit 181 as main image signals. The image processing unit 181 subtracts, from the input main image signals for the first column, the FPN correction value for the first column corresponding thereto. The image processing unit 181 performs the above-mentioned subtraction for each pixel signal for 3,000 columns, thus performing FPN correction processing. The pixel signals to which the FPN correction processing has been performed are subjected to the above-mentioned image processing and compression processing by the control circuit 18 and recorded in the memory card 32 as image data.

—Live View Mode—

When a live view mode is set by the operation of the operation unit 30, the control circuit 18 controls the quick return mirror 10 to be rotated into a position indicated by a broken line shown in FIG. 1, so that the light from the subject through the lens L1 can be guided to the image sensor 14. Further, the control circuit 18 instructs the timing generator 17 to turn ON the switches 142 (142A, 142B) through the vertical scan circuit 143 such that pixel signals can be output from those pixel photodiodes 141 subsampled (culled) in the vertical direction to ⅓ of all the pixels which constitute the image sensor 14. The pixel signals are read out in a frequency of, for example, 1/30 second.

Figure 4:
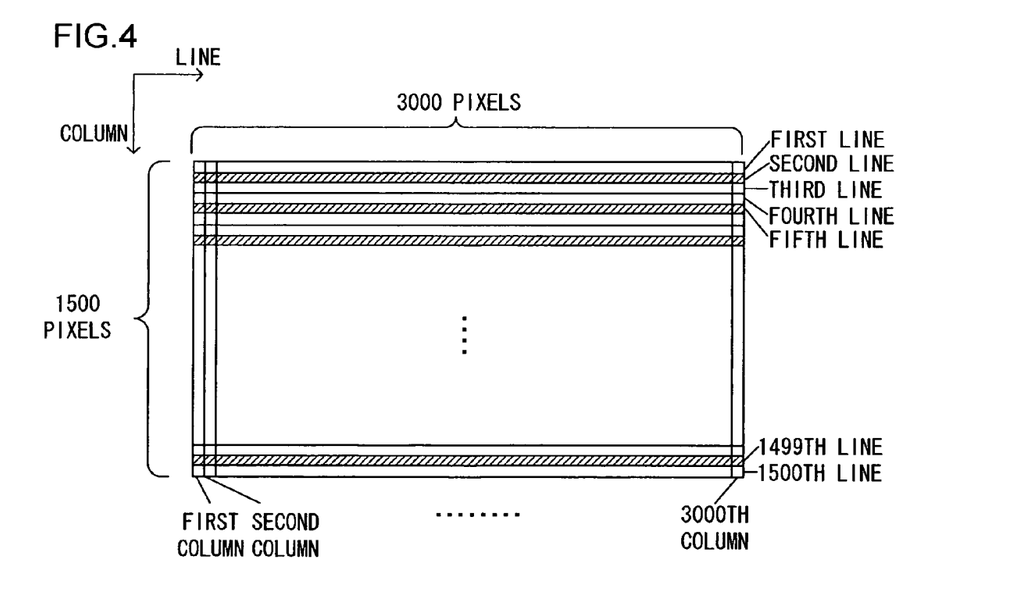
FIG. 4 is an area of pixels from which pixel signals are read out in a live view mode.

FIG. 4 shows pixels read out with subsampling in a live view mode. In this case, pixels from which pixel signals are read out are hatched. That is, the vertical scan circuit 143 selects second, fifth, . . . , and (3n−1)th lines (where n is a positive integer; n≦500) as selected lines and turns OFF the switches 142A of pixels contained in the selected lines and turns ON the switches 142B of pixels contained in the selected lines. As a result, for each column of the image sensor 14, pixel signals for FPN are read out from the total 500 pixel photodiodes 141 and the read out pixel data are input into the column processing circuit 144. That is, for each column of pixels in the image sensor 14, a pixel signal is read out from every three pixels such that a pixel signal is read out from each of the total 500 pixel photodiodes 141 and input into the column processing circuit 144. The column processing circuit 144 outputs the 500 pixel signals (FPN) to the control circuit 18 through the A/D conversion circuit 16. The column control circuit 18 averages the FPNs to calculate an FPN correction value 1 for each column in respect of the first frame.

When an image for the first frame is to be acquired, the switches 142A and 142B contained in the above-mentioned selected line together are turned ON and for each column of pixels in the image sensor 14, a pixel signal is read out from every three pixels such that a pixel signal (image signal) is read out from each of the total 500 pixel photodiodes 141. The read out image signals are input into the image processing unit 181 in the control circuit 18 through the column processing circuit 144 and the A/D conversion circuit 16. The image processing unit 181 subtracts, from the image signals for the first column, the above-mentioned FPN correction value 1 stored in the temporary memory 181. The image processing unit 181 performs the above-mentioned subtraction on each of the pixel signals for 3,000 columns to achieve FPN correction processing.

Also, when an image for a second frame is to be acquired, the image processing unit 181 averages pixel signals in each column for 3,000 columns obtained in a state where the switches 142A of the selected lines are turned OFF and the switches 142B of the selected lines are turned ON in the same manner as that when the image for the first frame was obtained to calculate an FPN correction value 2 for each column. The image processing unit 181 reads out the FPN correction value 1 that has been stored in the temporary memory 183, averages the calculated FPN correction value 2 and the read out FPN correction value 1 to calculate an FPN correction value $2_{AVE}$ for each column, and stores the calculated FPN correction value $2_{AVE}$ in the temporary memory 183. Subsequently, in the same manner as that in the case of the first frame, the FPN correction value $2_{AVE}$ for the corresponding column is subtracted from the pixel signal (image signal) of each of 3,000 columns to achieve FPN correction processing.

While images are being acquired in a live view mode, the image processing unit 181 calculates FPN correction values as mentioned above. That is, when an image for an Nth frame is to be acquired, an FPN correction value $(N-1)_{AVE}$ calculated when an image of the frame one frame before, i.e., an (N−1)th frame has been acquired is read out and an FPN correction value $N_{AVE}$ is calculated for each column using the following equation (1).

$$\text{FPN Correction Value } N_{AVE}\{\text{FPN Correction Value} \\ (N-1)_{AVE}+\text{FPN Correction Value } N\}/2 \qquad (1)$$

The image processing unit 181 performs FPN correction processing by subtracting the calculated FPN correction value $N_{AVE}$ from the pixel signal. Then, the image processing unit 181 performs the above-mentioned image processing on the pixel signal after the FPN correction processing to create image data. The control circuit 18 displays an image corresponding to the image data on the liquid crystal display 191.

When an instruction to the control circuit 18 is input by full press down operation of the release switch button after the image of the Nth frame has been acquired, the control circuit 18 instructs the timing generator 17 to turn ON all the switches 142. Then, the pixel signals output from all the pixels of the image sensor 14 are input into the image processing unit 181 as signals for a main image. The image processing unit 181 reads out the FPN correction value $N_{AVE}$ stored in the temporary memory 183 and subtracts, from the input main image signals, the FPN correction value $N_{AVE}$ of the column corresponding thereto. That is, the image processing unit 181 performs FPN correction processing on the input main image signals using the last FPN correction value $N_{AVE}$ acquired before the start of imaging.

Figure 5:
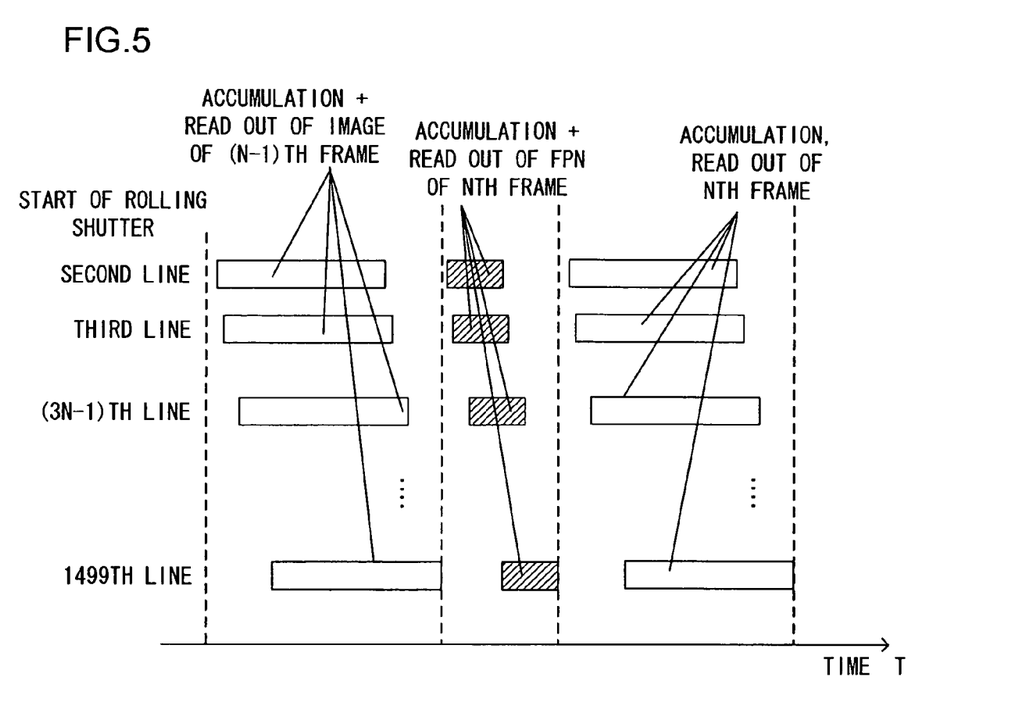
FIG. 5 is a diagram showing timing at which an offset signal is obtained.

In the above embodiment, it is configured such that an offset signal (FPN) used when an FPN correction value is to be calculated is obtained by turning the switches 142A of pixels in the selected line are turned OFF almost simultaneously and the switches 142B of pixels in the selected line are turned ON almost simultaneously. FIG. 5 illustrates this FPN acquisition action, particularly an action in a live view mode. FIG. 5 is a timing chart illustrating the relationship between the timing for acquiring offset signal (FPN) and the timing for acquiring an image of each frame when the above-mentioned live view mode is set.

Accumulation and read out of image signals in one frame i.e., (N−1) frame, of the live view image is first performed as shown in FIG. 5. On this occasion, both the switches 142A and 142B are ON. Then, after the accumulation and read out of image signal at 1499th line of the (N−1)th frame has been performed, accumulation and read out of FPN for a next frame, i.e., Nth frame, is performed. When the FPN is obtained, the switches 142A are OFF as already mentioned. When read out of the FPN at the 1499th line has been completed, accumulation and read out of image signals in the Nth frame, which is the first frame of the live view image, is performed in the same manner as that in the case of the above-mentioned (N−1)th frame. These actions are repeated until the live view is completed.

The various types of image processing as mentioned above are performed on the pixel signals to which FPN correction processing has been performed by the image processing unit 181 to generate image data. The generated image data is subjected to compression processing by the compression unit 183 and then recorded in the memory card 32 by the control circuit 18. Note that when images are serially captured (continuously shot), the image processing unit 181 performs FPN correction processing on a second and subsequent main image signals using the FPN correction value $N_{AVE}$ in the same manner as that in the case of the first main image signal. That is, in the case of continuous shooting, FPN correction processing is performed using the FPN correction value $N_{AVE}$ which is the same as the last obtained FPN correction value $N_{AVE}$ before the imaging is started.

Figure 6:
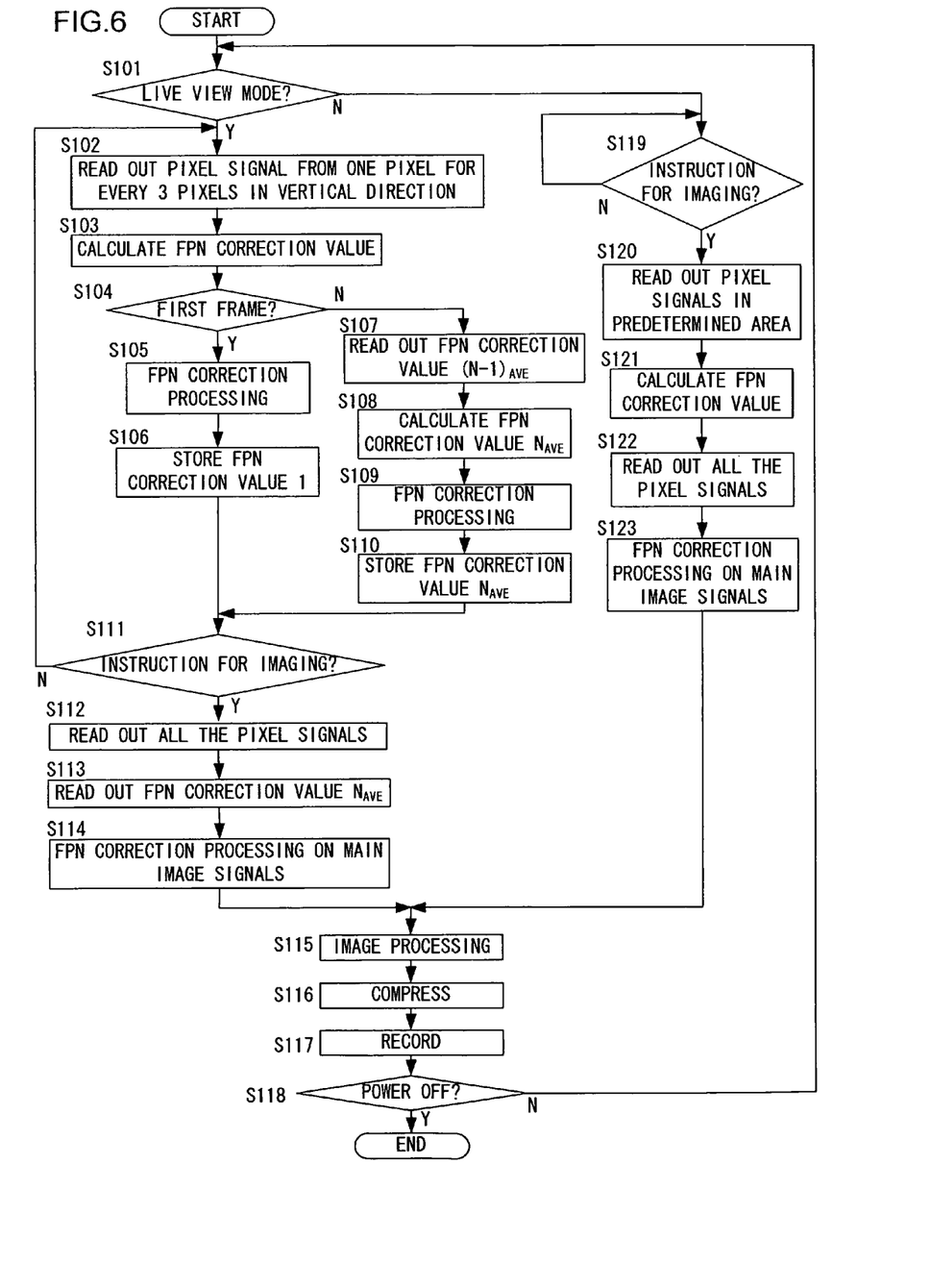
FIG. 6 is a flowchart illustrating FPN correction processing by the digital camera according to an embodiment of the present invention.

Referring to the flowchart shown in FIG. 6, the action of the FPN correction processing by the digital camera 1 according to the present embodiment is described. Each procedure in FIG. 6 is performed by executing a program by the control circuit 18. The program for performing each processing in FIG. 6 is stored in a memory (not shown) and launched when a signal indicating that power is ON is input from the operation unit 30.

In a step S101, it is determined whether or not a live view mode is set. If the live view mode is set, the result of the determination in the step S101 is YES, and the process is advanced to a step S102. If a still image capturing mode is set, the result of the determination in the step S101 is NO and the process is advanced to a step S119 to be detailed later.

In the step S102, the timing generator 17 is instructed to turn the switches 142B ON and the switches 142A OFF, so that pixel signals are output from pixel photodiodes 141 sub-sampled for every three pixels in the vertical direction and the process is advanced to a step S103. In the step S103, the input pixel signals (offset signals: FPN) are averaged for each column to calculate an FPN correction value N and the process is advanced to a step S104.

In the step S104, it is determined whether or not the acquired pixel signals are from the image of the first frame. When N=1, the result of the determination in the step S104 is YES and the process is advanced to a step S105. In the step S105, the FPN correction value 1 calculated in the step S103 is subtracted from the acquired pixel signals to perform FPN correction and the process is advanced to a step S106. In the step S106, the FPN correction value 1 is stored in the temporary memory 183 and then the process is advanced to a step S111.

If the acquired pixel signals are not from the image of the first frame, the result of the determination in the step S104 is NO and the process is advanced to a step S107 where the FPN correction value $(N-1)_{AVE}$ stored in the temporary memory 183 is read out. The process is then advanced to a step S108. In the step S108, FPN correction value $N_{AVE}$ is calculated using the equation (1) above and the process is advanced to a step S109. In the step S109, the calculated FPN correction value $N_{AVE}$ is subtracted from the acquired pixel signals to perform FPN correction processing and the process is advanced to a step S110. In the step S110, the FPN correction value $N_{AVE}$ calculated in the step S108 is stored in the temporary memory 183 and the process is advanced to a step S111.

In the step S111, it is determined whether or not the release switch button is fully pressed down. If the release switch button has not fully pressed down so that no instruction for imaging has been input, the result of the determination in the step S111 is NO and the process is returned to the step S102. If the release switch button has been fully pressed down so that an instruction for imaging has been input, the result of the determination in the step S111 is YES and the process is advanced to a step S112. In the step S112, the timing generator 17 is instructed to turn the switches 142 ON so that pixels signals are output from all the pixels of the image sensor 14 and the process is advanced to a step S113. In the step S113, the FPN correction value $N_{AVE}$ stored in the temporary memory 183 is read out and the process is advanced to a step S114.

In the step S114, the FPN correction value $N_{AVE}$ is subtracted from the main image signals read out in the step S112 to perform FPN correction and the process is advanced to a step S115. In the step S115, image processing is performed to generate image data and the process is advanced to a step S116. In the step S116, the generated image data are compressed and the process is advanced to a step S117. In the step S117, the compressed image data are recorded in the memory card 32 and the process is advanced to a step S118.

In the step S118, it is determined whether or not power is turned OFF. If a signal indicating that the power has been turned OFF is input, the result of the determination in the step S118 is YES and a series of processing is completed. If no signal indicting that the power has been turned OFF is input, the result of the determination in the step S118 is NO, and the process is returned to the step S101.

If the live view mode is not set, the result of the determination in the step S101 is NO and the process is advanced to a step S119, where it is determined whether or not the release switch button has been fully pressed down in the same manner as that in the step S111. If the release switch button has been fully pressed down to input an imaging instruction signal, the result of the determination in the step S119 is YES and the process is advanced to a step S120. If no imaging instruction signal has been input, the result of the determination in the step S119 is NO and the determination processing is repeated.

In the step S120, the timing generator 17 is instructed to turn the switches 1420N such that pixel signals are output from the pixel photodiodes 141 corresponding to a ⅓ area out of the total pixel area in the image sensor 14 and the process is advanced to a step S121. In the step S121, the input pixel signals are averaged for each column to calculate an FPN correction value N and the process is advanced to a step S122.

In the step S122, the timing generator 17 is instructed to turn the switches ON such that pixel signals are output from all the pixels in the image sensor 14 and the process is advanced to a step S123. In the step S123, the FPN correction value calculated in the step S121 is subtracted from the pixel signals acquired in the step S122 to perform FPN correction and the process is advanced to the step S115.

The digital camera according to the embodiments described above provides the following advantages.

(1) The image processing unit 181 is configured to average FPN correction value N calculated from pixel signals of a previous frame (i.e., (N−1)th frame) and an FPN correction value $(N-1)_{AVE}$ in order to calculate a new FPN correction value $N_{AVE}$ and correct the FPN for each pixel column. As a result, even when characteristics of internal circuits that constitute the column processing circuit 144 are varied due to various factors such as temperature, FPN correction values can be updated, so that the FPN correction can be performed with high precision and hence high quality photographic images can be obtained.

(2) The image processing unit 181 is configured such that when start of imaging is instructed by fully pressing down the release switch button in a live view mode, it performs correction on captured images using the last FPN correction value $N_{AVE}$ used in the live view mode (step S114). Therefore, it is unnecessary to acquire new pixel signals for calculating FPN correction values, so that a release time lag is decreased while maintaining the precision of FPN correction. However, the present invention is not limited to use of the last FPN correction value $N_{AVE}$ used in the live view mode as the FPN correction value $N_{AVE}$.

(3) The image processing unit 181 is configured such that in the live view mode, it acquires pixel signals from, for example, one pixel from every three pixels in the column direction as pixels in the predetermined lines out of all the pixels contained in the image sensor 14 in order to calculate FPN correction value $N_{AVE}$ (steps S103 and S108). Therefore, the load required for the processing by the image processing unit 181 is reduced, so that even when high speed processing is required for the calculation of FPN correction values and FPN correction, high quality photographic images with FPN correction can be obtained.

(4) The image processing unit 181 is configured such that when continuous image capturing (continuous shooting) is performed, it performs FPN correction processing on main image signals using the same FPN correction value $N_{AVE}$ as the FPN correction value $N_{AVE}$ acquired last before the start of the imaging. Therefore, no new pixel signals have to be acquired in order to calculate FPN correction values, so that high quality photographic images with FPN correction can be obtained while maintaining the speed of continuous shooting.

The digital camera according to the embodiments described above may be a digital camera of a fixed lens type in place of an interchangeable lens type.

The above described embodiments are examples and various modifications can be made without departing from the scope of the invention.

What is claimed is:

1. An imaging apparatus comprising:
an image sensor having a plurality of pixels arranged in an array that captures an image of a subject, each of the pixels outputting noise signal and image signal including the noise signal:,
a calculation unit that calculates a correction value by using the noise signals, the correction value being for correcting an error of the image signals output from the image sensor for each column of the array of the pixels; and
a correction unit that corrects the image signals using the correction value calculated by the calculation unit, wherein:
in a live view mode in which a plurality of frames of the images corresponding to the image signals are continuously displayed on a display, the pixels output the noise signals and subsequently output the image signals for each frame,
the calculation unit calculates the correction value for each frame and calculates an averaged correction value for a current frame, the averaged correction value being calculated by averaging the current correction value for the current frame and the previous averaged correction value for a previous frame, and
the correction unit corrects the image signals for the current frame by using the averaged correction value for the current frame.

2. An imaging apparatus according to claim 1, further comprising:
an instruction unit that instructs start of capturing a still image, wherein
when the start of capturing the still image is instructed by the instruction unit in the live view mode, the correction unit corrects a captured still image using the averaged correction value used in the live view mode.

3. An imaging apparatus according to claim 2, wherein
the correction unit corrects the captured image using the averaged correction value that was used last in the live view mode.

4. An imaging apparatus according to claim 2, wherein:
the instruction unit further includes a continuous shooting instruction unit that instructs continuous capturing of the images,
when the continuous capturing of the images is instructed by the continuous shooting instruction unit, the correction unit performs correction by using a same correction value for each frame of the images captured continuously.

5. An imaging apparatus according to claim 1, wherein
the correction unit performs the correction by using the correction value calculated before the start of the imaging or by using the averaged correction value calculated during the imaging.

6. An imaging apparatus according to claim 1, wherein
the calculation unit, in the live view mode, acquires the image signals from pixels in at least one predetermined line among all the pixels included in the image sensor and calculates the correction value that corresponds to the pixels in the at least one predetermined line.

7. An imaging apparatus comprising:

an image sensor having a plurality of pixels arranged in an array that captures an image of a subject, each of the pixels outputting noise signal and image signal including the noise signal;

a calculation unit that calculates a correction value by using the noise signals in a live view mode in which the images corresponding to the image signals are continuously displayed on a display, the correction value being for correcting an error of the image signals output from the image sensor for each column of the array of the pixels;

a correction unit that corrects the image signals using the correction value calculated by the calculation unit; and an instruction unit that instructs start of imaging a still image that is not displayed on the display, wherein in the live view mode the pixels output the noise signals and subsequently output the image signals for each frame, and when start of imaging is instructed by the instruction unit in the live view mode, the pixels output the image signals for the still image, and the correction unit corrects the image signals for the still image using the correction value that has been used in the live view mode.

8. An imaging apparatus according to claim 7, wherein the correction unit corrects the image signals by using the correction value that was used last in the live view mode.

9. An imaging apparatus according to claim 7, further comprising:

a continuous shooting instruction unit that instructs continuous capturing of the images, wherein when the continuous capturing of the images is instructed by the continuous shooting instruction unit, the correction unit performs correction using a same correction value for each frame of the images captured continuously.

* * * * *